(12) United States Patent
Doveri

(10) Patent No.: US 10,364,780 B2
(45) Date of Patent: Jul. 30, 2019

(54) AIR INTAKE STRUCTURE FOR A MOTORCYCLE ENGINE

(71) Applicant: Piaggio & C. S.p.A, Pontedera (PI) (IT)

(72) Inventor: Stefano Doveri, Pontedera (IT)

(73) Assignee: PIAGGIO & C. S.P.A., Pontedera (PI) (IT)

( * ) Notice: Subject to any disclaimer, the term of this patent is extended or adjusted under 35 U.S.C. 154(b) by 0 days.

(21) Appl. No.: 15/565,007

(22) PCT Filed: Apr. 14, 2016

(86) PCT No.: PCT/IB2016/052118
§ 371 (c)(1),
(2) Date: Oct. 6, 2017

(87) PCT Pub. No.: WO2016/166688
PCT Pub. Date: Oct. 20, 2016

(65) Prior Publication Data
US 2018/0100474 A1    Apr. 12, 2018

(30) Foreign Application Priority Data

Apr. 16, 2015    (IT) .................. 102015000011947

(51) Int. Cl.
*F02M 35/10*    (2006.01)
*B01D 46/10*    (2006.01)
(Continued)

(52) U.S. Cl.
CPC ....... *F02M 35/162* (2013.01); *B01D 46/0041* (2013.01); *B01D 46/10* (2013.01);
(Continued)

(58) Field of Classification Search
CPC .. F02M 35/162; F02M 35/024; F02M 35/104; F02M 35/10262; F02M 35/10013; B01D 46/10; B01D 46/0041
See application file for complete search history.

(56) References Cited

FOREIGN PATENT DOCUMENTS

EP        0602591 A1    6/1994
EP        1526273 A2    4/2005
(Continued)

*Primary Examiner* — Jacob M Amick
(74) *Attorney, Agent, or Firm* — Volpe and Koenig, P.C.

(57) ABSTRACT

An motorcycle air intake structure includes: a container divided by a main baffle into two distinct chambers: a first chamber communicating externally and a second chamber communicating with a throttled body via a feeding duct; the two chambers separated by an air filter, positioned at the main baffle, the first and second chambers extending longitudinally side-by-side defining opposite sides of the air intake structure. The air intake further includes a pre-chamber accessing the first chamber, separated therefrom by a cross wall and communicating therewith via an access duct crossing said wall, with an inlet end thereof arranged in the pre-chamber and an outlet end thereof arranged in the first chamber, the pre-chamber arranged on the front side with respect to a forward vehicle direction. The pre-chamber includes a front access mouth; and a diverting baffle interposed between the access mouth and the inlet end of the access duct.

5 Claims, 5 Drawing Sheets

(51) Int. Cl.
*F02M 35/16* (2006.01)
*F02M 35/024* (2006.01)
*B01D 46/00* (2006.01)
*F02M 35/104* (2006.01)

(52) U.S. Cl.
CPC ........ *F02M 35/024* (2013.01); *F02M 35/104* (2013.01); *F02M 35/10013* (2013.01); *F02M 35/10262* (2013.01); *B01D 46/0026* (2013.01); *B01D 2279/60* (2013.01); *Y02T 10/146* (2013.01)

(56) References Cited

FOREIGN PATENT DOCUMENTS

| | | | | |
|---|---|---|---|---|
| EP | 1533515 A1 | * | 5/2005 | ............. B62K 11/00 |
| EP | 1880934 B1 | | 11/2009 | |
| WO | 2013095881 A1 | | 6/2013 | |

* cited by examiner

AIR INTAKE STRUCTURE FOR A MOTORCYCLE ENGINE

The present invention has as subject an air intake structure feeding air to an engine, in particular of motorcycle type.

This type of structure generally comprises a container divided by a baffle into two distinct chambers and placed side by side longitudinally: a first chamber communicating with outside and a second chamber communicating with a throttled body by means of a feeding duct; the two chambers are separated by a filter providing for the air cleaning to avoid that the throttled body could be reached by air with impurities which could jeopardize the engine operation.

The air intake structure usually is arranged on one side of a motor vehicle, substantially below the saddle level and not far from the road surface, therefore the risk of sucking an excessive quantity of impurities is tangible, impurities which could obstruct the filter.

In some models, the obstruction risk is kept under control by means of a suitable fairing protecting the air inlet area. In the European patent application Nr. 1,880,934 B1 an air intake structure is described with a sucking mouth arranged above the transmission of the motorcycle, at a certain distance from the ground, a position which however shortens the air path and decreases the cleaning effectiveness.

In the European patent application Nr. 1,533,515 an air intake structure is described, having an access pre-chamber communicating to said first chamber, with an access mouth directed towards the inner side of the structure, i.e. towards the vehicle, in a position not safe in consideration of the impurity entry.

The technical problem underlying the present invention is to provide an air intake structure allowing to obviate the drawback mentioned with reference to the known art.

Such problem is solved by an air intake structure as defined in the enclosed claim 1.

The main advantage of the air intake structure according to the present invention lies in considerably reducing the risk of obstructing the filter inside thereof.

The present invention will be described hereinafter according to two preferred examples thereof, provided by way of example and not for limitative purposes with reference to the enclosed drawings wherein.

Figure 1:
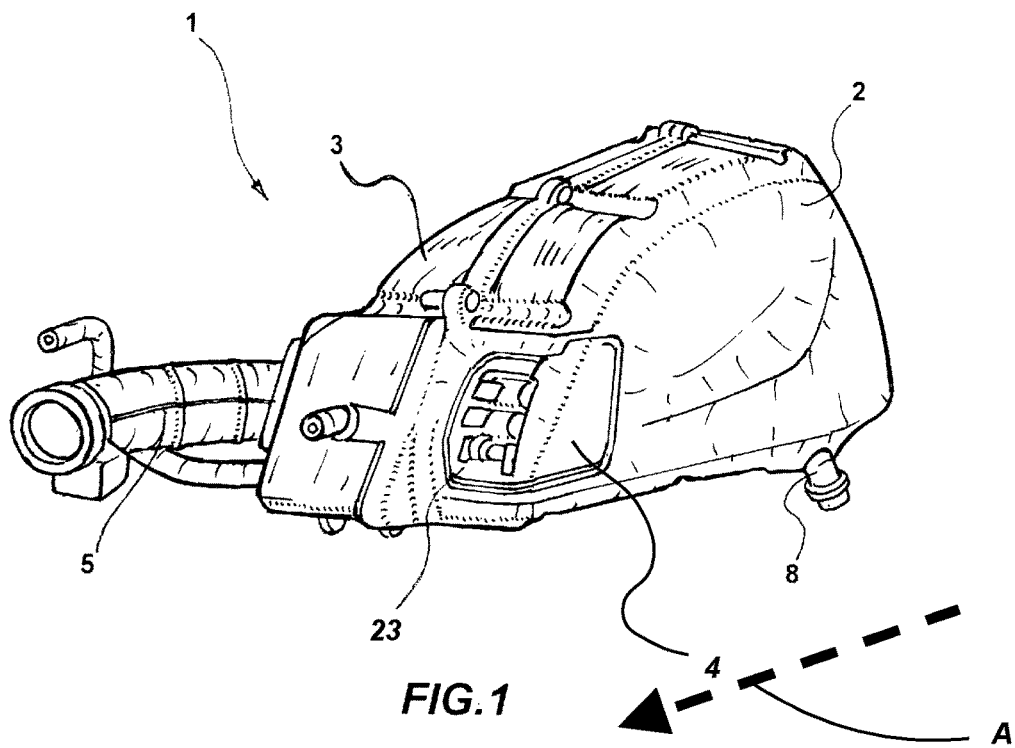
FIG. 1 shows a perspective view of a first embodiment example of air intake structure according to the invention.
Figure 2:
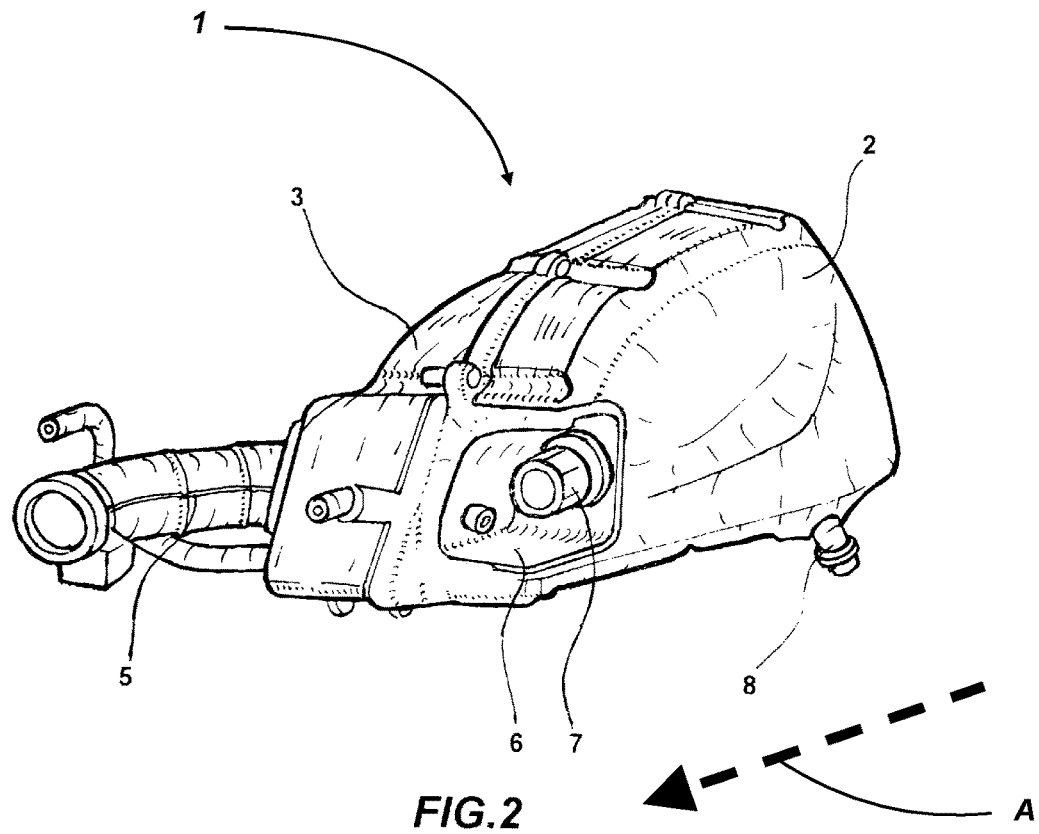
FIG. 2 shows the perspective view of FIG. 1 with a portion open for viewing.
Figure 3:
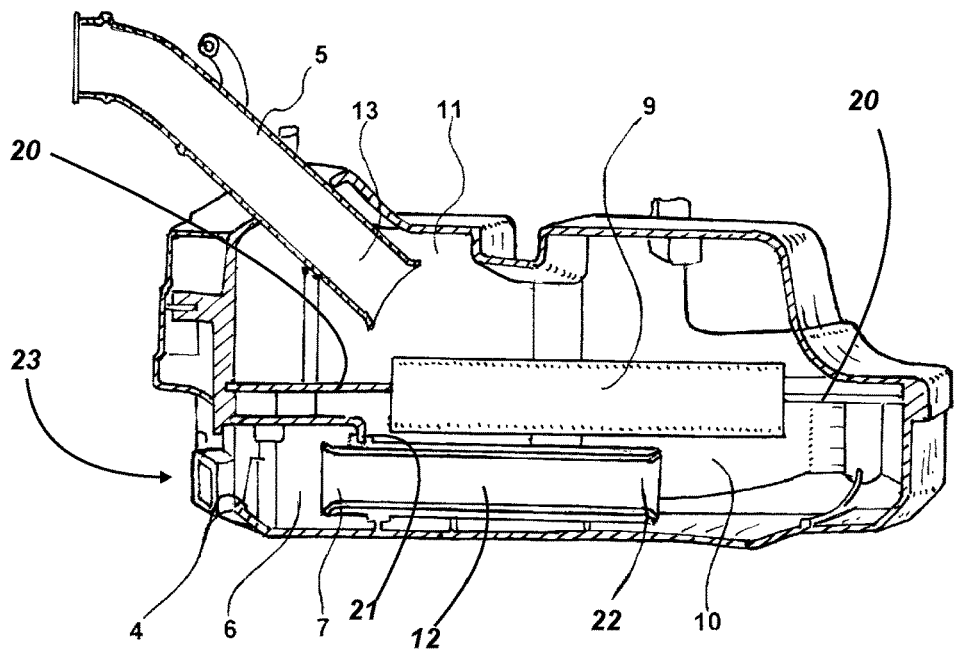
FIG. 3 shows a section of the air intake structure of FIG. 1.
Figure 4:
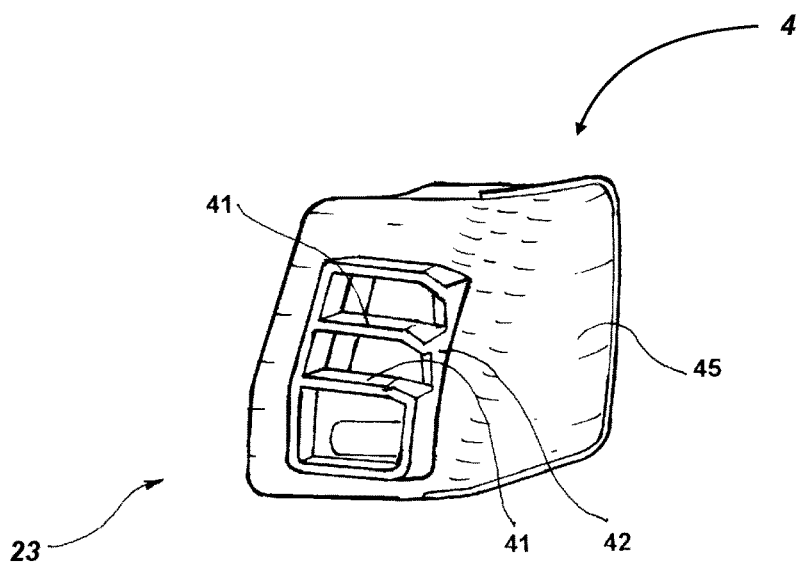
FIG. 4 shows a front perspective view of an element of the air intake structure of FIG. 1.
Figure 5:
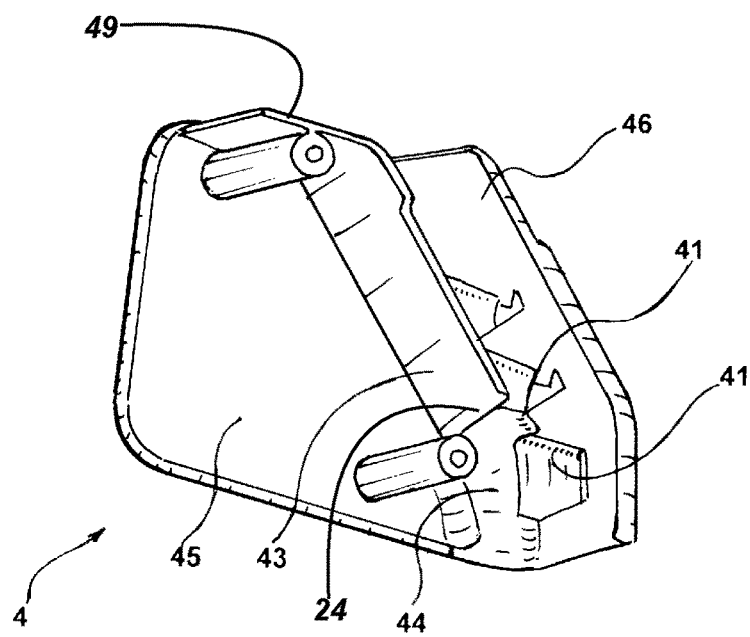
FIG. 5 shows a rear perspective view of the element of FIG. 4.
Figure 6:
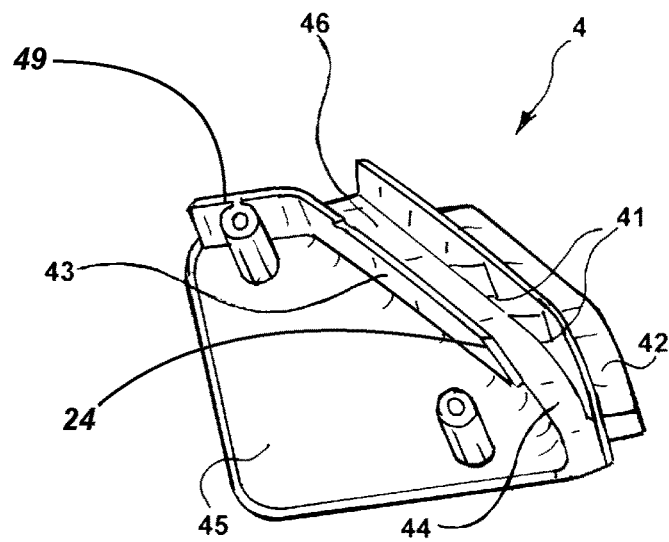
FIG. 6 shows a side view of the element of FIG. 4.

By referring to FIGS. 1 to 6, a first example of an air intake structure is designated as a whole with 1. It comprises a container formed by two half-shells: a first half-shell 2 apt to be exposed on the outer side of a motor vehicle and a second half-shell 3 apt to be arranged between the first half-shell 2 and the motor vehicle.

Inside, the two half-shells 2, 3 respectively correspond to a first chamber 10 communicating with outside, receiving air from the atmosphere, and to a second chamber 11 therefrom the air is conveyed to a throttled body through a feeding duct 5, partially shown, having a proximal end 13 inside the second chamber 11.

The first and the second chamber 10, 11, as a consequence of the shape of the half-shells 2, 3, extend longitudinally side by side so as to define opposite sides of the air intake structure 1.

Said container then is divided by a main baffle 20 into the two chambers 10, 11 mentioned above, defined by the respective half-shells 2, 3; the two chambers are separated by a filter 9 embedded in a suitable compartment, which is positioned at said main baffle 20 and which is provided for the air cleaning.

The air intake structure 1 further comprises a pre-chamber 6 accessing said first chamber 10, separated therefrom by a cross wall (21) and communicating therewith by means of an access duct 12 crossing said wall 21, with an inlet end thereof 7 arranged in said pre-chamber 6 and an outlet end 22 thereof arranged in said first chamber 10.

The pre-chamber 6 is arranged on the front side with respect to a forward direction A of the motorcycle.

The first chamber 10, in an opposite direction with respect to the pre-chamber 6, has an opening 8 for discharging possible liquid impurities, protected by a removable plug.

The pre-chamber 6 is formed by a removable portion 4 which is fastened, in particular by means of not shown screws, to the first half-shell 2 on the pre-chamber 6. It has a side wall 45 and an access mouth 23 opened outside, directed toward the front side, which then results to be positioned on the first half-shell 2.

The access mouth 23 is obtained in a front wall 46 of said removable portion 4, and it is protected by a louver (FIGS. 4 and 5), i.e. by a pair of fins or slats 41 arranged transversally to the access mouth 23.

Furthermore, the access mouth 23 is surrounded by projecting walls 42 determining an access channel addressing the air longitudinally with respect to the development of the structure 1.

The pre-chamber 6 includes a diverting baffle 43 which is interposed between the access mouth 23 and said inlet end 7 of said access duct 12. Hence, the diverting baffle 43 is placed in a position transversal to the air path, and it extends from a peripheral wall of said pre-chamber 6, in particular a top wall 49 thereof, to a terminal end thereof 24, with a forward leaning according to the forward direction A of the vehicle. The diverting baffle 43, with the peripheral walls of said pre-chamber 6, forms a passage opening 44 arranged on the lower side, which is staggered with respect to said access mouth 23.

In this way, the direct access of the air from the access mouth 23 to the access duct 12 is prevented: the air is forced to follow a diverted path involving the accumulation of possible impurities onto the bottom of the pre-chamber 6.

Figure 7:
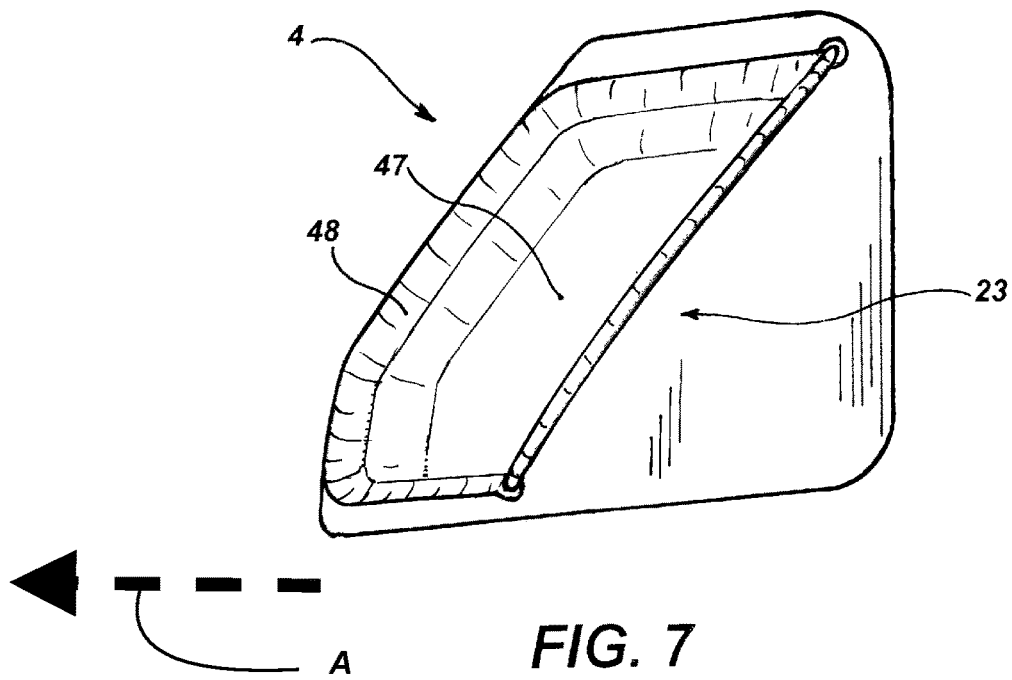
FIG. 7 shows a side view of a component of a second embodiment example of air intake structure according to the invention, replacing an analogous component of the first embodiment example.
Figure 8:
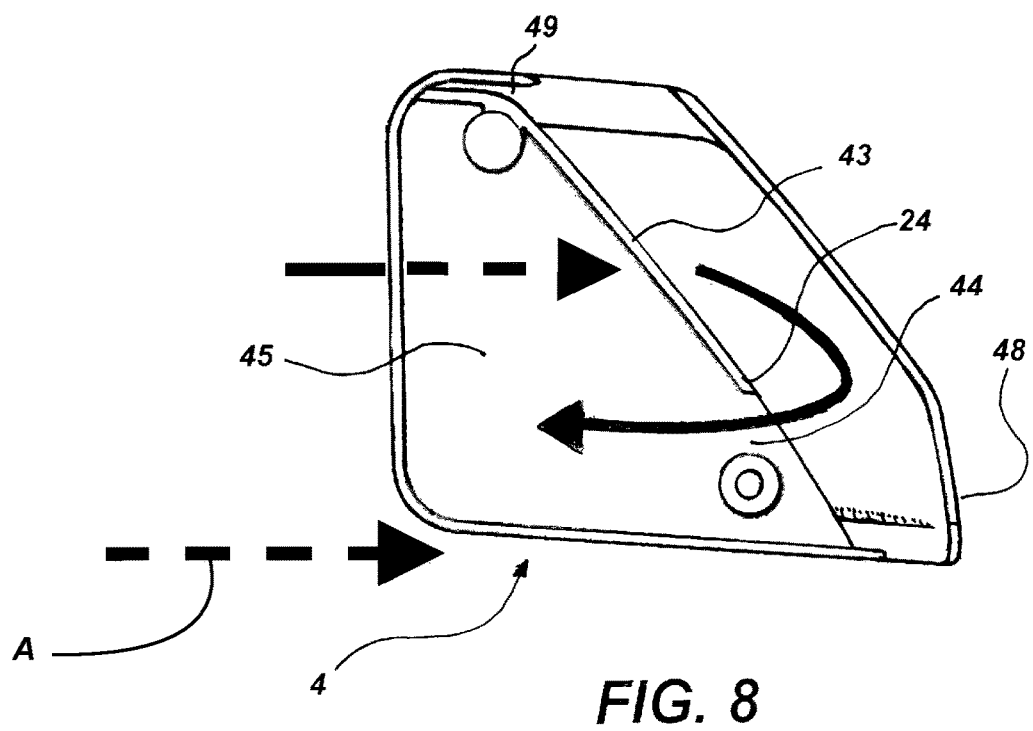
FIG. 8 shows another side view, from the opposite side, of the component of FIG. 1.
Figure 9:
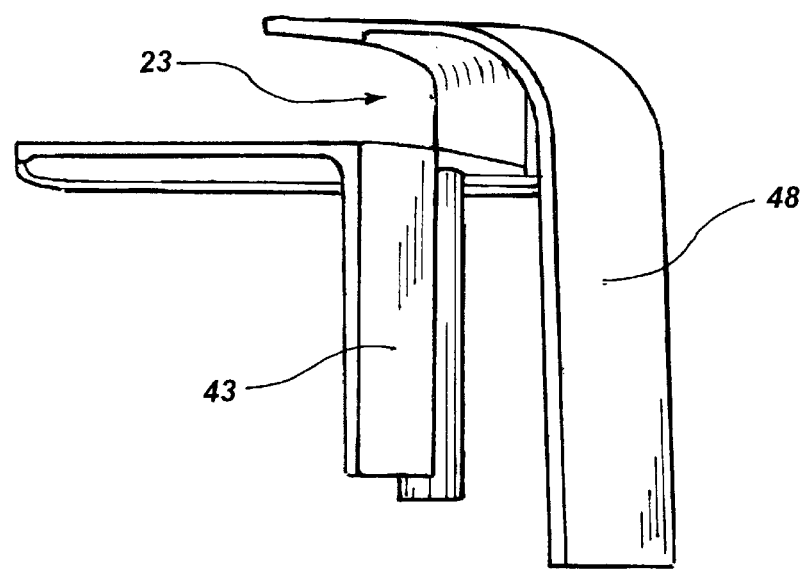
FIG. 9 shows a cross section taken according to a horizontal plane in FIGS. 7 and 8.
Figure 10:
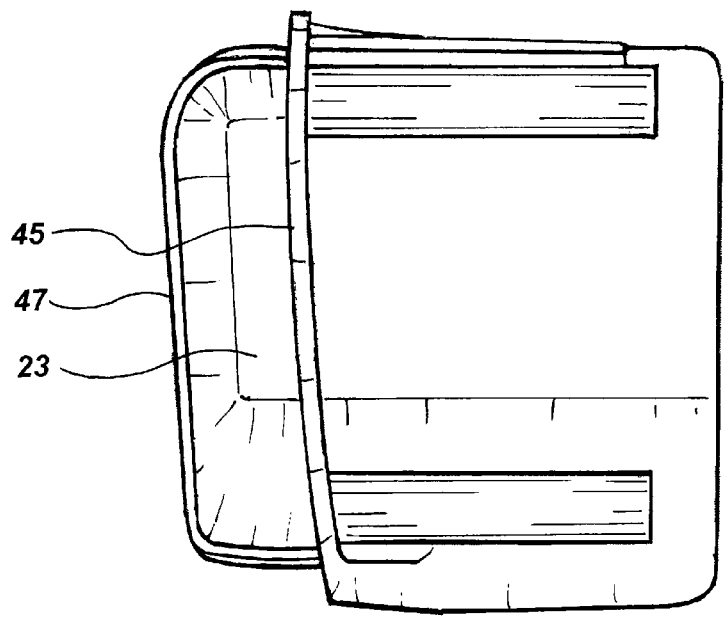
FIG. 10 shows a cross section taken according to a vertical plane in FIGS. 7 and 8.

By referring to FIGS. 7 to 10, a pre-chamber with different shape with respect to the previous one is described, according to an additional embodiment example of the structure of the present invention. The portions which, in an example or in the other one, are analogous to each other are indicated by the same reference numeral.

The component having some differences, from an example to the other one, is the removable portion 4, with an access mouth 23 with different shape. The removable portion on the front side has a U-shaped joint 47 forming a closed front wall 48 and an access mouth 23 which is directed in the opposite direction with respect to the forward direction A (FIGS. 7 and 8) of the vehicle.

In this way, the air flow must perform first of all a U-shaped turn on a horizontal plane around the side wall 45, and then another U-like turn around the diverting baffle 43, this time on a vertical plane.

It is to be noted that the U-shaped joint is positioned so that the access mouth 23 is on the outer side of the motorcycle, even if this is not shown.

To the above-described air intake structure a person skilled in the art, with the purpose of satisfying additional and contingent needs, could introduce several additional modifications and variants, all however within the protective scope of the present invention, as defined by the enclosed claims.

The invention claimed is:

1. An air intake structure, feeding air to an engine of a motorcycle, the air intake structure comprising:
a container divided by a main baffle into two distinct chambers: a first chamber communicating with outside and a second chamber communicating with a throttled body by means of a feeding duct; the two chambers being separated by a filter, positioned at said main baffle, providing for air cleaning, the first and the second chambers extending longitudinally side-by-side so as to define opposite sides of the air intake structure;
wherein the container is formed by two half-shells: a first half-shell configured to be exposed on an outer side of a motor vehicle, to which said first chamber corresponds, and a second half-shell configured to be arranged between the first half-shell and the motor vehicle, to which said second chamber corresponds
wherein the air intake structure further comprises a pre-chamber accessing said first chamber, separated therefrom by a cross wall and communicating therewith by means of an access duct crossing said wall, with an inlet end thereof arranged in said pre-chamber and an outlet end thereof arranged in said first chamber, said pre-chamber being arranged on the front side with respect to a forward direction of the vehicle; and
wherein the pre-chamber comprises a front access mouth, opened outside, the pre-chamber further comprises a diverting baffle interposed between said access mouth and the inlet end of said access duct, transversal to an air path, extending from a peripheral wall of said pre-chamber as far as a terminal end thereof which forms, with the peripheral walls of said pre-chamber, a passage opening staggered with respect to said access mouth and wherein the pre-chamber is formed by a removable portion which is fastened to the first half-shell, the access mouth being directed in an opposite direction with respect to the forward direction of the vehicle by a U-shaped joint connecting the access mouth to said passage opening of said removable portion.

2. The air intake structure according to claim 1, wherein the pre-chamber is formed by a removable portion which is fastened to the first half-shell, the access mouth being obtained in a front wall of said removable portion.

3. The air intake structure according to claim 2, wherein, said access mouth is protected by a louver, comprising a pair of slats arranged transversally to the access mouth.

4. The air intake structure according to claim 2, wherein the access mouth is surrounded by projecting walls determining an access channel addressing the air longitudinally with respect to the development of the air intake structure.

5. The air intake structure according to claim 3, wherein the access mouth is surrounded by projecting walls determining an access channel addressing the air longitudinally with respect to the development of the air intake structure.

* * * * *